(12) United States Patent
Zou et al.

(10) Patent No.: US 9,956,656 B2
(45) Date of Patent: May 1, 2018

(54) ELECTRONIC CIGARETTE ATOMIZER OILING AND LABELING DEVICE

(71) Applicant: O-NET AUTOMATION TECHNOLOGY (SHENZHEN) LIMITED, Shenzhen, Guangdong (CN)

(72) Inventors: Haisheng Zou, Guangdong (CN); Zhicheng Li, Guangdong (CN); Feng Chen, Guangdong (CN); Xuebin Yu, Guangdong (CN); Weizhao Tang, Guangdong (CN); Lin Yang, Guangdong (CN); Fei Shen, Guangdong (CN); Qinglin Na, Guangdong (CN)

(73) Assignee: O-NET AUTOMATION TECHNOLOGY (SHENZHEN) LIMITED, Shenzhen (CN)

( * ) Notice: Subject to any disclaimer, the term of this patent is extended or adjusted under 35 U.S.C. 154(b) by 0 days. days.

(21) Appl. No.: 15/324,734

(22) PCT Filed: Jul. 9, 2014

(86) PCT No.: PCT/CN2014/081908
§ 371 (c)(1),
(2) Date: Jan. 9, 2017

(87) PCT Pub. No.: WO2016/004592
PCT Pub. Date: Jan. 14, 2016

(65) Prior Publication Data
US 2017/0196267 A1  Jul. 13, 2017

(51) Int. Cl.
*B23P 21/00* (2006.01)
*B65B 3/04* (2006.01)
(Continued)

(52) U.S. Cl.
CPC ............. *B23P 21/006* (2013.01); *B23P 19/02* (2013.01); *B23Q 39/04* (2013.01); *B65B 3/04* (2013.01);
(Continued)

(58) Field of Classification Search
CPC ....... B23P 19/004; B23P 19/006; B23P 19/02; B23P 19/10; B23P 21/006; B23Q 39/04;
(Continued)

(56) References Cited

U.S. PATENT DOCUMENTS 3,948,616 A * 4/1976 Gardner ................. B23P 19/08
29/429
4,790,438 A * 12/1988 Wilhelm ................ B07C 5/344
209/573
(Continued)

FOREIGN PATENT DOCUMENTS

CN       2819833 Y  *  9/2006
CN     202744313 U  *  2/2013
(Continued)

*Primary Examiner* — Sunil K Singh
*Assistant Examiner* — Michael Vitale

(57) ABSTRACT

This disclosure provides oil filling and labeling apparatuses for atomizers of electronic cigarettes, which include a rack provided with a table board. A material pick-up operation position, an oil filling operation position, an assembling operation position, a labeling operation position and a pressing operation position for silicon rubber sleeve are provided on the table board. The oil filling and labeling apparatuses for the atomizers of the electronic cigarettes further include a material loading mechanism, an oil filling mechanism, a mechanism for mounting oil-sealing ring, a mechanism for mounting end cap, an electric resistance detection mechanism, a first material rotation mechanism, a labeling mechanism, a second material rotation mechanism and a mechanism for pressing silicon rubber sleeve. The atomizer of the (Continued)

electronic cigarette is successively conveyed for processing among such mechanisms.

10 Claims, 1 Drawing Sheet

(51) Int. Cl.
*B65B 7/28* (2006.01)
*B23P 19/02* (2006.01)
*B23Q 39/04* (2006.01)

(52) U.S. Cl.
CPC ............ *B65B 7/28* (2013.01); *Y10T 29/49829* (2015.01); *Y10T 29/5137* (2015.01); *Y10T 29/53343* (2015.01)

(58) Field of Classification Search
CPC ................ B65B 3/04; Y10T 29/49826; Y10T 29/49828; Y10T 29/49829; Y10T 29/5124; Y10T 29/5136; Y10T 29/5137; Y10T 29/53074; Y10T 29/53078; Y10T 29/53339; Y10T 29/53343; Y10T 29/53383; Y10T 29/53391
USPC .............. 29/428, 429, 430, 563, 564, 564.1; 53/135.1, 284.5, 415, 467
See application file for complete search history.

(56) References Cited

U.S. PATENT DOCUMENTS 5,209,044 A * 5/1993 D'Addario ................ B65B 3/04
53/272
2014/0261477 A1* 9/2014 Mueller ................... A24C 5/34
131/281

FOREIGN PATENT DOCUMENTS

CN 103801933 A * 5/2014
CN 203754390 U * 8/2014

* cited by examiner

ELECTRONIC CIGARETTE ATOMIZER OILING AND LABELING DEVICE

TECHNICAL FIELD

This disclosure relates to assembling of atomizers of electronic cigarettes, and particularly to oil filling and labeling apparatuses for atomizers of electronic cigarettes.

BACKGROUND

Atomizers of electronic cigarettes are mainly assembled through manual operation up to now. As higher and higher demand is put forward for processing quality, appliances including an air press and an oscillating cylinder can be used to partially replace the manual operation in some procedures. In the view of a complete process flow, however, the atomizers of the electronic cigarettes cannot be produced using a complete machine. Accordingly, production efficiency is low and is highly dependent upon labor.

SUMMARY OF THIS DISCLOSURE

The technical problem to be solved in this disclosure is to provide oil filling and labeling apparatuses for atomizers of electronic cigarettes.

Aiming at such technical problems, the technical solution in this disclosure is to provide an oil filling and labeling apparatus for an atomizer of an electronic cigarette, which apparatus includes a rack provided with a table board. A material pick-up operation position, an oil filling operation position, an assembling operation position, a labeling operation position and a pressing operation position for silicon rubber sleeve are provided on the table board. The oil filling and labeling apparatus also includes a material loading mechanism, a material pick-up mechanism, an oil filling mechanism, a mechanism for mounting oil-sealing ring, a mechanism for mounting end cap, an electric resistance detection mechanism, a first material rotation mechanism, a labeling mechanism, a second material rotation mechanism and a mechanism for pressing silicon rubber sleeve.

The material loading mechanism is arranged on one side of the rack, and operates to transport the atomizer of the electronic cigarette to the material pick-up operation position.

The material pick-up mechanism is arranged in the material pick-up operation position, and operates to transfer the atomizer of the electronic cigarette from the material pick-up operation position to the oil filling operation position.

The oil filling mechanism is arranged in the oil filling operation position. It operates to fill oil into the atomizer of the electronic cigarette and further to transfer the atomizer of the electronic cigarette to the assembling operation position.

The mechanism for mounting oil-sealing ring is arranged in the assembling operation position, and operates to mount an oil-sealing ring into the atomizer of the electronic cigarette.

The mechanism for mounting end cap is arranged in the assembling operation position, and operates to mount an end cap into the atomizer of the electronic cigarette.

The electric resistance detection mechanism is arranged in the assembling operation position, and operates to detect an electric resistance of the atomizer of the electronic cigarette.

The first material rotation mechanism is arranged between the assembling operation position and the labeling operation position. It operates to rotate the atomizer of the electronic cigarette from a vertical orientation to a horizontal orientation and further to transfer the atomizer of the electronic cigarette from the assembling operation position to the labeling operation position.

The labeling mechanism is arranged in the labeling operation position, and operates to affix a label onto the atomizer of the electronic cigarette.

The second material rotation mechanism is arranged between the labeling operation position and the pressing operation position for silicon rubber sleeve, and operates to transfer the atomizer of the electronic cigarette from the labeling operation position to the pressing operation position for silicon rubber sleeve.

The mechanism for pressing silicon rubber sleeve is arranged in the pressing operation position for silicon rubber sleeve, and operates to mount a silicon rubber sleeve into the atomizer of the electronic cigarette.

The atomizer of the electronic cigarette is successively conveyed for processing among the material loading mechanism, the oil filling mechanism, the mechanism for mounting oil-sealing ring, the mechanism for mounting end cap, the electric resistance detection mechanism, the first material rotation mechanism, the labeling mechanism, the second material rotation mechanism and the mechanism for pressing silicon rubber sleeve.

In the oil filling and labeling apparatus for the atomizer of the electronic cigarette of this disclosure, the material loading mechanism includes a synchronous transport device and a transport motor.

The synchronous transport device includes a driving wheel, a driven wheel and a synchronous belt, where the synchronous belt extends to the material pick-up operation position and the driving wheel is in drive connection with the transport motor.

In the oil filling and labeling apparatus for the atomizer of the electronic cigarette of this disclosure, the material pick-up mechanism includes a mounting base arranged on the rack. The mounting base is provided with a first oscillating cylinder, where a free end of the first oscillating cylinder is connected with a first gas claw. The first gas claw is provided with a pair of clamping arms for picking up or putting down the atomizer of the electronic cigarette.

In the oil filling and labeling apparatus for the atomizer of the electronic cigarette of this disclosure, the oil filling mechanism includes an oil filling turntable and several oil filling syringes arranged along an edge of the oil filling turntable. The several oil filling syringes are equally distributed along a circumferential direction of the oil filling turntable.

In the oil filling and labeling apparatus for the atomizer of the electronic cigarette of this disclosure, the assembling operation position is further provided with an assembling turntable and several positioning seats arranged along an edge of the assembling turntable. The several positioning seats are equally distributed along a circumferential direction of the oil filling turntable.

The mechanism for mounting oil-sealing ring, the mechanism for mounting end cap and the electric resistance detection mechanism are all arranged on one side of the assembling turntable. The atomizer of the electronic cigarette which is placed within the positioning seat passes through the mechanism for mounting oil-sealing ring, the mechanism for mounting end cap and the electric resistance detection mechanism successively with the rotation of the assembling turntable.

In the oil filling and labeling apparatus for the atomizer of the electronic cigarette of this disclosure, the mechanism for mounting oil-sealing ring includes a vibration disk for oil-sealing ring, a pick-up rail for oil-sealing ring and a press-fit mechanism for oil-sealing ring. The vibration disk for oil-sealing ring is connected with the press-fit mechanism for oil-sealing ring through the pick-up rail for oil-sealing ring.

In the oil filling and labeling apparatus for the atomizer of the electronic cigarette of this disclosure, the mechanism for mounting end cap includes a vibration disk for end cap, a pick-up rail for end cap and a press-fit mechanism for end cap. The vibration disk for end cap is connected with the press-fit mechanism for end cap through the pick-up rail for end cap.

In the oil filling and labeling apparatus for the atomizer of the electronic cigarette of this disclosure, the labeling mechanism includes a labeling roller chain, a labeling machine, a laser marking machine, a driving motor and a positioning mechanism for preventing the atomizer of the electronic cigarette from deviation. The labeling machine and the laser marking machine are arranged above the labeling roller chain, the labeling roller chain is in drive connection with the driving motor, and the positioning mechanism is arranged at a leading end of the labeling roller chain.

In the oil filling and labeling apparatus for the atomizer of the electronic cigarette of this disclosure, the pressing operation position for silicon rubber sleeve is further provided with an assembling roller. An axial direction of the assembling roller is in parallel with that of the atomizer of the electronic cigarette, and several assembling slots are equally distributed along an edge of the assembling roller.

In the oil filling and labeling apparatus for the atomizer of the electronic cigarette of this disclosure, the mechanism for pressing silicon rubber sleeve includes a vibration disk for silicon rubber sleeve, a pick-up rail for silicon rubber sleeve and a press-fit mechanism for silicon rubber sleeve. The vibration disk for silicon rubber sleeve is connected with the press-fit mechanism for silicon rubber sleeve through the pick-up rail for silicon rubber sleeve. There are two mechanisms for pressing silicon rubber sleeve which are respectively arranged on two sides of the assembling roller.

The oil filling and labeling apparatuses for the atomizers of the electronic cigarettes in this disclosure are integrated with multiple procedures during the manufacturing of the atomizers of the electronic cigarettes, so as to achieve mechanized and automatic production for the atomizers of the electronic cigarettes. In this way, there is no need of great manpower consumption, and workers' labor intensity in the electronic cigarette industry is highly decreased. Moreover, the oil filling and labeling apparatuses for the atomizers of the electronic cigarettes have high assembling accuracy and excellent detection quality, which thus improves product quality and production efficiency of the atomizers of the electronic cigarettes and reduces production cost of the atomizers of the electronic cigarettes.

BRIEF DESCRIPTION OF THE DRAWINGS

This disclosure is further described with reference to accompanying drawings and embodiments below. In the figures.

Figure 1:
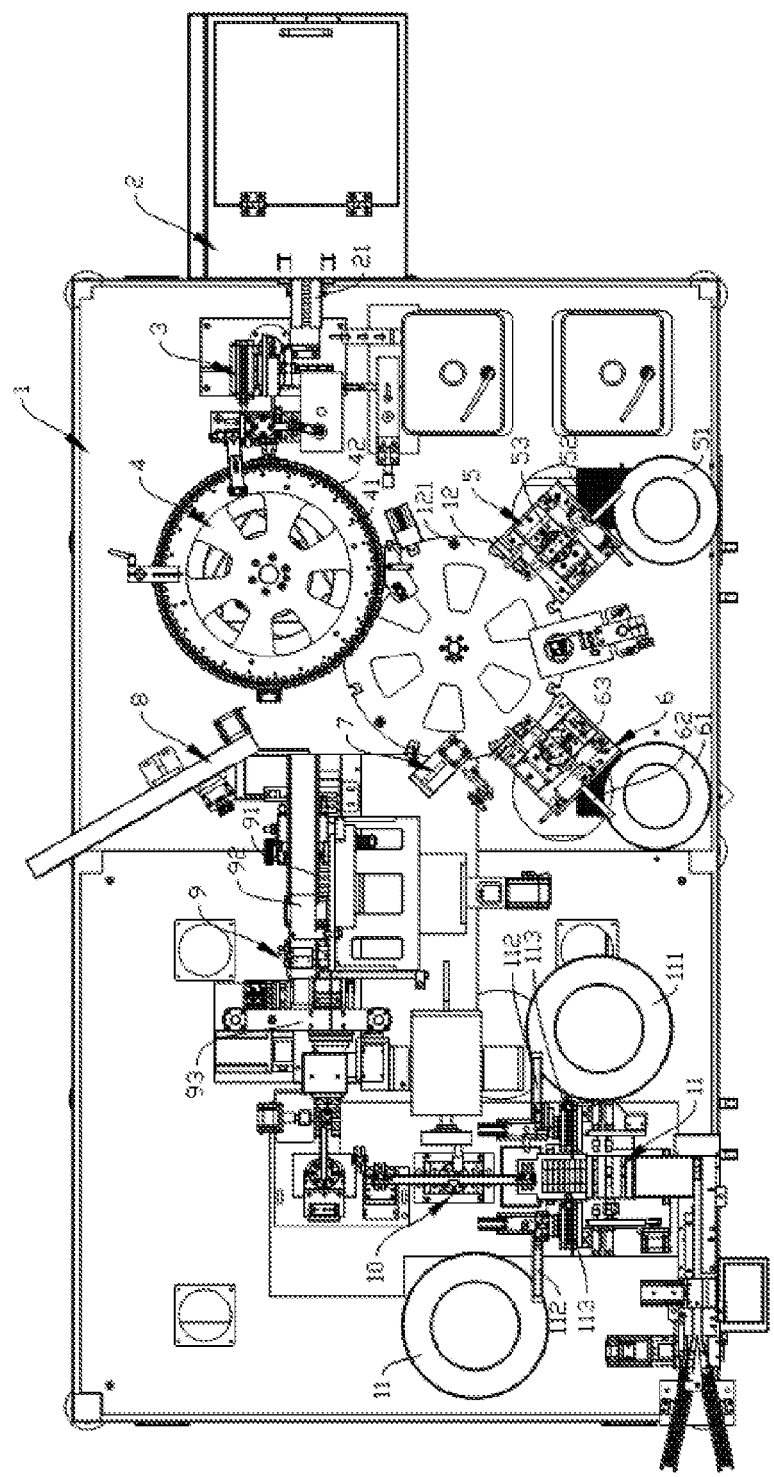
FIG. 1 is a top view for an oil filling and labeling apparatus for an atomizer of an electronic cigarette according to an embodiment of this disclosure.

DESCRIPTION OF REFERENCE SIGNS 1 rack
2 material loading mechanism
21 synchronous belt
3 material pick-up mechanism
4 oil filling mechanism
41 oil filling turntable
42 oil filling syringe
5 mechanism for mounting oil-sealing ring
51 vibration disk for oil-sealing ring
52 pick-up rail for oil-sealing ring
53 press-fit mechanism for oil-sealing ring
6 mechanism for mounting end cap
61 vibration disk for end cap
62 pick-up rail for end cap
63 press-fit mechanism for end cap
7 electric resistance detection mechanism
8 first material rotation mechanism
9 labeling mechanism
91 labeling roller chain
92 labeling machine
93 laser marking machine
10 second material rotation mechanism
11 mechanism for pressing silicon rubber sleeve
111 vibration disk for silicon rubber sleeve
112 pick-up rail for silicon rubber sleeve
113 press-fit mechanism for silicon rubber sleeve
12 assembling turntable
121 positioning seat

DETAILED DESCRIPTION

Specific implementations of this disclosure are described in detail with reference to accompanying drawings so as to clearly understand technical features, objectives and effects of this disclosure.

FIG. 1 illustrates an oil filling and labeling apparatus for an atomizer of an electronic cigarette according to an embodiment of this disclosure. The oil filling and labeling apparatus for the atomizer of the electronic cigarette is integrated with all the assembling procedures of the atomizer of the electronic cigarette so as to achieve mechanized production for the atomizer of the electronic cigarette. Referring to FIG. 1, the oil filling and labeling apparatus for the atomizer of the electronic cigarette includes a rack 1, a material loading mechanism 2, a material pick-up mechanism 3, an oil filling mechanism 4, a mechanism for mounting oil-sealing ring 5, a mechanism for mounting end cap 6, an electric resistance detection mechanism 7, a first material rotation mechanism 8, a labeling mechanism 9, a second material rotation mechanism 10 and a mechanism for pressing silicon rubber sleeve 11.

The atomizer of the electronic cigarette is successively conveyed for processing among the material loading mechanism 2, the material pick-up mechanism 3, the oil filling mechanism 4, the mechanism for mounting oil-sealing ring 5, the mechanism for mounting end cap 6, the electric resistance detection mechanism 7, the first material rotation mechanism 8, the labeling mechanism 9, the second material rotation mechanism 10 and the mechanism for pressing silicon rubber sleeve 11.

The rack 1 functions as a main body structure of the oil filling and labeling apparatus for the atomizer of the electronic cigarette, where the rack 1 is mainly used to place and accommodate each assembling mechanism. A table board of the rack 1 is provided with a material pick-up operation position, an oil filling operation position, an assembling operation position, a labeling operation position and a pressing operation position for silicon rubber sleeve. During operation, the atomizer of the electronic cigarette is assembled as successively passing through the material pick-up operation position, the oil filling operation position, the assembling operation position, the labeling operation position and the pressing operation position for silicon rubber sleeve. The whole operation process is both time-saving and labor-saving, and thus production efficiency is improved while labor cost is decreased.

The material loading mechanism 2 arranged on one side of the rack 1 mainly functions as loading the atomizer of the electronic cigarette; that is, the atomizer of the electronic cigarette is transported to the material pick-up operation position by the material loading mechanism 2. The atomizers of the electronic cigarettes can be in various specifications. It can be understood that the material loading mechanism 2 is correspondingly capable of loading the atomizers of the electronic cigarettes in various specifications, so as to ensure that the oil filling and labeling apparatus for the atomizer of the electronic cigarette can be widely and universally used.

Further, the material loading mechanism 2 includes a synchronous transport device and a transport motor. The synchronous transport device includes a driving wheel, a driven wheel and a synchronous belt 21, where the synchronous belt 21 extends to the material pick-up operation position and the driving wheel is in drive connection with the transport motor. The driving wheel is connected to a driving shaft of the transport motor. In this case, when the transport motor is started, the driving wheel rotates together with the driving shaft, and the synchronous belt 21 also rotates under the transmission of the driving wheel, thereby transporting the atomizer of the electronic cigarette to the material pick-up operation position for material feeding.

It can be understood that the material loading mechanism 2 for loading the atomizer of the electronic cigarette is not limited to the transmission structure based on the synchronous belt 2. Alternatively, any other conventional transmission conveying structures, such as mechanical hand, chain transmission or gear transmission, can also be used as the material loading mechanism 2.

The material pick-up mechanism 3 arranged in the material pick-up operation position mainly operates to transfer the atomizer of the electronic cigarette from the material loading mechanism 2 to the oil filling mechanism 4. That is, the atomizer of the electronic cigarette is moved from the material pick-up operation position to the oil filling operation position by the material pick-up mechanism 3.

Further, the material pick-up mechanism 3 includes a mounting base arranged on the rack 1. The mounting base is provided with an oscillating cylinder, where a free end of the oscillating cylinder is connected with a gas claw. The gas claw is provided with a pair of clamping arms for picking up or putting down the atomizer of the electronic cigarette. The oscillating cylinder is in rotary oscillation between the material pick-up operation position and the oil filling operation position, where a rotation angle is preferred to be 90 degree.

A material pushing mechanism in coordination with the material pick-up mechanism 3 is further arranged on the rack 1. The material pushing mechanism includes a sensor for determining an upward or a downward orientation of the atomizer of the electronic cigarette and a material pushing air cylinder for pushing the atomizer of the electronic cigarette. The material pushing mechanism is also arranged in the material pick-up operation position. Since the atomizer of the electronic cigarette transported to the material pick-up operation position may be randomly arranged in an upward or a downward orientation, it is required to determine the upward or the downward direction of the atomizer of the electronic cigarette before moving the atomizer of the electronic cigarette to the oil filling mechanism 4 in the oil filling operation position. In this way, subsequent operations can be ensured to be accurate and coherent.

The oil filling mechanism 4 arranged in the oil filling operation position mainly operates for filling oil into the atomizer of the electronic cigarette. The oil filling mechanism 4 includes an oil filling turntable 41 and several oil filling syringes 42 arranged along an edge of the oil filling turntable 41. The several oil filling syringes 42 are equally distributed along a circumferential direction of the oil filling turntable 41. In this case, the oil is filled in a dripping mode by usage of the syringe, and benefit of this filling operation lies in that it is convenient to absorb tobacco tar by oil absorption cotton and thus the atomizer of the electronic cigarette is effectively prevented from oil leakage during the oil filling. Besides, the oil filling mechanism 4 transfers the atomizer of the electronic cigarette filled with the oil to the assembling operation position for further assembling and processing.

The assembling operation position is provided with an assembling turntable 12 and several positioning seats 121 arranged along an edge of the assembling turntable 12. The positioning seat 121 mainly operates to fix the atomizer of the electronic cigarette, so that the atomizer can be assembled accurately. The several positioning seats 121 are equally distributed along a circumferential direction of the oil filling turntable 41. The oil filling turntable 41 is generally in coordination with a stepping motor; that is, the oil filling turntable 41 is rotated by a fixed rotation angle. In this case, the atomizer of the electronic cigarette can be moved accurately based on a reasonable distribution of the positioning seats 121, thereby improving an assembling accuracy and an assembling efficiency for the atomizer of the electronic cigarette.

The mechanism for mounting oil-sealing ring 5, the mechanism for mounting end cap 6 and the electric resistance detection mechanism 7 are all arranged on one side of the assembling turntable 12. The atomizer of the electronic cigarette which is placed within the positioning seat 121 passes through the mechanism for mounting oil-sealing ring 5, the mechanism for mounting end cap 6 and the electric resistance detection mechanism 7 successively with the rotation of the assembling turntable 12.

The mechanism for mounting oil-sealing ring 5 arranged in the assembling operation position mainly operates to mount an oil-sealing ring into the atomizer of the electronic cigarette. The mechanism for mounting oil-sealing ring 5 includes a vibration disk for oil-sealing ring 51, a pick-up rail for oil-sealing ring 52 and a press-fit mechanism for oil-sealing ring 53. The vibration disk for oil-sealing ring 51 is connected with the press-fit mechanism for oil-sealing ring 53 through the pick-up rail for oil-sealing ring 52. The oil-sealing ring within the vibration disk for oil-sealing ring 51 is first loaded to the press-fit mechanism for oil-sealing ring 53 by the pick-up rail for oil-sealing ring 52, and is then pressed into the atomizer of the electronic cigarette by the press-fit mechanism for oil-sealing ring 53.

The mechanism for mounting end cap 6 arranged in the assembling operation position mainly operates to mount an end cap into the atomizer of the electronic cigarette. The mechanism for mounting end cap 6 includes a vibration disk for end cap 61, a pick-up rail for end cap 62 and a press-fit mechanism for end cap 63. The vibration disk for end cap 61 is connected with the press-fit mechanism for end cap 63 through the pick-up rail for end cap 62. The end cap within the vibration disk for end cap 61 is first loaded to the press-fit mechanism for end cap 63 by the pick-up rail for end cap 62, and is then pressed into the atomizer of the electronic cigarette by the press-fit mechanism for end cap 63.

The electric resistance detection mechanism 7 arranged in the assembling operation position mainly operates to detect an electric resistance of the atomizer of the electronic cigarette, so as to effectively control the quality of the atomizer of the electronic cigarette during its assembling. Since the electric resistance detection mechanism 7 is arranged downstream of the mechanism for mounting oil-sealing ring 5 and the mechanism for mounting end cap 6, the electric resistance detection mechanism 7 can detect the electric resistance of the atomizer of the electronic cigarette before finishing the assembling of the atomizer of the electronic cigarette. In this way, some defective goods can be timely detected and recycled during the assembling, which not only promotes product quality but also reduces waste of the defective goods.

The first material rotation mechanism 8 is further arranged between the assembling operation position and the labeling operation position. The first material rotation mechanism 8 mainly operates to rotate the atomizer of the electronic cigarette from a vertical orientation to a horizontal orientation and to further transfer the atomizer of the electronic cigarette from the assembling operation position to the labeling operation position. The atomizer of the electronic cigarette is in the vertical orientation after the processing in the assembling operation position. However, the labeling operation is required to be performed on a lateral wall of the atomizer of the electronic cigarette. For this reason, the atomizer of the electronic cigarette is required to be rotated from the vertical orientation to the horizontal orientation. It can be understood that the atomizer of the electronic cigarette can be rotated from the vertical orientation to the horizontal orientation in many ways, such as using a rotary mechanical hand or a rotary clamp commonly found now. Those structures which are used as the first material rotation mechanism 8 to be capable of rotating the atomizer of the electronic cigarette from the vertical orientation to the horizontal orientation should be included within the protection scope of this disclosure.

The labeling mechanism 9 arranged in the labeling operation position mainly operates to affix a label to the atomizer of the electronic cigarette. The labeling mechanism 9 includes a labeling roller chain 91, a labeling machine 92, a laser marking machine 93, a driving motor and a positioning mechanism for preventing the atomizer of the electronic cigarette from deviation. The labeling machine 92 and the laser marking machine 93 are arranged above the labeling roller chain 91. The labeling machine 92 mainly operates to affix a paper label onto a lateral surface of the atomizer of the electronic cigarette, and the laser marking machine 93 mainly operates to mark identifications such as a trademark on the lateral surface of the atomizer of the electronic cigarette. The labeling machine 92 can be arranged upstream of the laser marking machine 93, and vice versa. In an embodiment of this disclosure, however, it is preferred that the atomizer of the electronic cigarette passes through the labeling machine 92 and then the laser marking machine 93 in sequence.

Further, the labeling roller chain 91 is in drive connection with the driving motor, and the positioning mechanism is arranged at a leading end of the labeling roller chain 91. The positioning mechanism mainly operates to make the atomizer of the electronic cigarette be aligned to the labeling machine 92 during the labeling operation. In this case, it is ensured to the greatest extent that the label may not be affixed with deviation by the labeling machine 92 during the labeling operation, and automatic deviation rectification can be achieved for the atomizer of the electronic cigarette during the labeling, thereby reducing the defective goods produced from deviated labeling and further ensuring high rate of accepted goods for the atomizer of the electronic cigarette.

The second material rotation mechanism 10 is further arranged between the labeling operation position and the pressing operation position for silicon rubber sleeve, where the second material rotation mechanism 10 mainly operates to fetch the atomizer of the electronic cigarette from the labeling operation position to the pressing operation position for silicon rubber sleeve. Any conventional fetching mechanism such as an oscillating cylinder, a gas claw and a rotary mechanical hand can be used as the second material rotation mechanism 10. Those structures which are used as the second material rotation mechanism 10 to be capable of fetching the atomizer of the electronic cigarette from the labeling operation position to the pressing operation position for silicon rubber sleeve should be included within the protection scope of this disclosure.

The mechanism for pressing silicon rubber sleeve 11 arranged in the pressing operation position for silicon rubber sleeve mainly operates to mount a silicon rubber sleeve into the atomizer of the electronic cigarette and further to unload the atomizer of the electronic cigarette. The pressing operation position for silicon rubber sleeve is further provided with an assembling roller, where an axial direction of the assembling roller is in parallel with that of the atomizer of the electronic cigarette; that is, in the case where the atomizer of the electronic cigarette is in the horizontal orientation, the assembling roller is also oriented horizontally. Several assembling slots are equally distributed along an edge of the assembling roller, where the assembling slot mainly operates to fix the atomizer of the electronic cigarette so as to press the silicon rubber sleeve. Generally, both ends of the atomizer of the electronic cigarette are respectively provided with the silicon rubber sleeve, and correspondingly there are two mechanisms for pressing silicon rubber sleeve 11 which are respectively arranged on two sides of the assembling roller. It can be understood that one mechanism for pressing silicon rubber sleeve 11 is needed when the atomizer of the electronic cigarette is provided with the silicon rubber sleeve on one end. In an embodiment of this disclosure, however, it is preferred that both sides of the assembling roller are respectively provided with the mechanism for pressing silicon rubber sleeve 11.

Further, the mechanism for pressing silicon rubber sleeve 11 includes a vibration disk for silicon rubber sleeve 111, a pick-up rail for silicon rubber sleeve 112 and a press-fit mechanism for silicon rubber sleeve 113. The vibration disk for silicon rubber sleeve 111 is connected with the press-fit mechanism for silicon rubber sleeve 113 through the pick-up rail for silicon rubber sleeve 112. The silicon rubber sleeves within the vibration disk for silicon rubber sleeve 111 are first loaded to the press-fit mechanism for silicon rubber sleeve 113 by the pick-up rail for silicon rubber sleeve, and are then pressed into both ends of the atomizer of the electronic cigarette by the press-fit mechanism for silicon rubber sleeve 113. The atomizer of the electronic cigarette with the silicon rubber sleeve at its both ends is unloaded by the mechanism for pressing silicon rubber sleeve 11.

As stated above, the oil filling and labeling apparatuses for the atomizers of the electronic cigarettes in this disclosure can achieve mechanized production for the atomizers of the electronic cigarettes, and the production process is basically implemented through automatic operations. In this way, there is no need of great manpower consumption, and workers' labor intensity in the electronic cigarette industry is highly decreased. Moreover, the oil filling and labeling apparatuses for the atomizers of the electronic cigarettes have high assembling accuracy and excellent detection quality, which thus improves product quality and production efficiency of the atomizer of the electronic cigarette and reduces production cost of the atomizer of the electronic cigarette.

The foregoing are preferred embodiments rather than limitations of this disclosure. Those skilled persons in the art can make various modifications, combinations and variations. Any modifications, equivalences and improvements without departing from the spirit and the principle of this disclosure should be included in the scope of this disclosure.

The invention claimed is:

1. An oil filling and labeling apparatus for an atomizer of an electronic cigarette, comprising: a rack; a table board of the rack is provided with a material pick-up operation position, an oil filling operation position, an assembling operation position, a labeling operation position and a pressing operation position for silicon rubber sleeves; wherein said apparatus further comprises: a material loading mechanism arranged on one side of the rack and used to transport the atomizer of the electronic cigarette to the material pick-up operation position; a material pick-up mechanism arranged in the material pick-up operation position and used to transfer the atomizer of the electronic cigarette from the material pick-up operation position to the oil filling operation position; an oil filling mechanism arranged in the oil filling operation position, and used to fill oil into the atomizer of the electronic cigarette and to transfer the atomizer of the electronic cigarette to the assembling operation position; a mechanism for mounting oil-sealing rings arranged in the assembling operation position and used to mount an oil-sealing ring into the atomizer of the electronic cigarette; a mechanism for mounting end caps arranged in the assembling operation position and used to mount an end cap into the atomizer of the electronic cigarette; an electric resistance detection mechanism arranged in the assembling operation position and used to detect an electric resistance of the atomizer of the electronic cigarette; a first material rotation mechanism arranged between the assembling operation position and the labeling operation position, and used to rotate the atomizer of the electronic cigarette from a vertical orientation to a horizontal orientation and further to transfer the atomizer of the electronic cigarette from the assembling operation position to the labeling operation position; a labeling mechanism arranged in the labeling operation position and used to perform labeling for the atomizer of the electronic cigarette; a second material rotation mechanism arranged between the labeling operation position and the pressing operation position for silicon rubber sleeves, and used to transfer the atomizer of the electronic cigarette from the labeling operation position to the pressing operation position for silicon rubber sleeves; a mechanism for pressing silicon rubber sleeves arranged in the pressing operation position for silicon rubber sleeves, and used to mount a silicon rubber sleeve into the atomizer of the electronic cigarette; wherein the atomizer of the electronic cigarette is successively conveyed for processing to the material loading mechanism, the material pick-up mechanism, the oil filling mechanism, the mechanism for mounting oil-sealing rings, the mechanism for mounting end caps, the electric resistance detection mechanism, the first material rotation mechanism, the labeling mechanism, the second material rotation mechanism and the mechanism for pressing silicon rubber sleeves.

2. The oil filling and labeling apparatus for the atomizer of the electronic cigarette of claim 1, wherein the material loading mechanism includes a synchronous transport device and a transport motor; the synchronous transport device includes a driving wheel, a driven wheel and a synchronous belt, wherein the synchronous belt extends to the material pick-up operation position and the driving wheel is in drive connection with the transport motor.

3. The oil filling and labeling apparatus for the atomizer of the electronic cigarette of claim 1, wherein the material pick-up mechanism includes a mounting base arranged on the rack; the mounting base is provided with a first oscillating cylinder, and a free end of the first oscillating cylinder is connected with a first gas claw; wherein the first gas claw is provided with a pair of clamping arms for picking up or putting down the atomizer of the electronic cigarette.

4. The oil filling and labeling apparatus for the atomizer of the electronic cigarette of claim 1, wherein the oil filling mechanism includes an oil filling turntable and a plurality of oil filling syringes arranged along an edge of the oil filling turntable; the plurality oil filling syringes are equally distributed along a circumferential direction of the oil filling turntable.

5. The oil filling and labeling apparatus for the atomizer of the electronic cigarette of claim 1, wherein the assembling operation position is further provided with an assembling turntable and a plurality of positioning seats arranged along an edge of the assembling turntable; the plurality of positioning seats are equally distributed along a circumferential direction of the oil filling turntable; wherein the mechanism for mounting oil-sealing rings, the mechanism for mounting end caps and the electric resistance detection mechanism are all arranged on one side of the assembling turntable; and the atomizer of the electronic cigarette which is placed within the positioning seat passes through the mechanism for mounting oil-sealing rings, the mechanism for mounting end caps and the electric resistance detection mechanism with the rotation of the assembling turntable.

6. The oil filling and labeling apparatus for the atomizer of the electronic cigarette of claim 1, wherein the mechanism for mounting oil-sealing rings includes a vibration disk for oil-sealing rings, a pick-up rail for oil-sealing rings and a press-fit mechanism for oil-sealing rings; the vibration disk for oil-sealing rings is connected with the press-fit mechanism for oil-sealing rings through the pick-up rail for oil-sealing rings.

7. The oil filling and labeling apparatus for the atomizer of the electronic cigarette of claim 1, wherein the mechanism for mounting end caps includes a vibration disk for end caps, a pick-up rail for end caps and a press-fit mechanism for end caps; the vibration disk for end caps is connected with the press-fit mechanism for end caps through the pick-up rail for end caps.

8. The oil filling and labeling apparatus for the atomizer of the electronic cigarette of claim 1, wherein the labeling mechanism includes a labeling roller chain, a labeling machine, a laser marking machine, a driving motor and a positioning mechanism for preventing the atomizer of the electronic cigarette from deviation; the labeling machine and the laser marking machine are arranged above the labeling roller chain, the labeling roller chain is in drive connection with the driving motor, and the positioning mechanism is arranged at a leading end of the labeling roller chain.

9. The oil filling and labeling apparatus for the atomizer of the electronic cigarette of claim 1, wherein the pressing operation position for silicon rubber sleeves is further provided with an assembling roller; an axial direction of the assembling roller is in parallel with that of the atomizer of the electronic cigarette, and a plurality of assembling slots are equally distributed along an edge of the assembling roller.

10. The oil filling and labeling apparatus for the atomizer of the electronic cigarette of claim 9, wherein the mechanism for pressing silicon rubber sleeves includes a vibration disk for silicon rubber sleeves, a pick-up rail for silicon rubber sleeves and a press-fit mechanism for silicon rubber sleeves; the vibration disk for silicon rubber sleeves is connected with the press-fit mechanism for silicon rubber sleeves through the pick-up rail for silicon rubber sleeves; and there are two of said mechanisms for pressing silicon rubber sleeves which are respectively arranged on two sides of the assembling roller.

* * * * *